(12) United States Patent
Kim et al.

(10) Patent No.: US 12,722,313 B2
(45) Date of Patent: Sep. 1, 2026

(54) FINGER ASSEMBLY AND ROBOT HAND COMPRISING SAME

(71) Applicants: KOREA UNIVERSITY OF TECHNOLOGY AND EDUCATION INDUSTRY-UNIVERSITY COOPERATION FOUNDATION, Cheonan-si (KR); NAVER LABS CORPORATION, Seongnam-si (KR)

(72) Inventors: Yong Jae Kim, Cheonan-si (KR); Han Sol Song, Daejeon (KR)

(73) Assignees: KOREA UNIVERSITY OF TECHNOLOGY AND EDUCATION INDUSTRY-UNIVERSITY COOPERATION FOUNDATION, Cheonan-si (KR); NAVER Corporation, Seongnam-si (KR)

( * ) Notice: Subject to any disclaimer, the term of this patent is extended or adjusted under 35 U.S.C. 154(b) by 1070 days.

(21) Appl. No.: 17/815,680

(22) Filed: Jul. 28, 2022

(65) Prior Publication Data

US 2022/0362949 A1 Nov. 17, 2022

Related U.S. Application Data

(63) Continuation of application No. PCT/KR2021/001008, filed on Jan. 26, 2021.

(30) Foreign Application Priority Data

Jan. 30, 2020 (KR) ........................ 10-2020-0011359

(51) Int. Cl.

| | |
|---|---|
| ***B25J 15/12*** | (2006.01) |
| ***B25J 15/02*** | (2006.01) |
| ***B25J 15/10*** | (2006.01) |

(52) U.S. Cl.
CPC ........... *B25J 15/12* (2013.01); *B25J 15/0213* (2013.01); *B25J 15/103* (2013.01)

(58) Field of Classification Search
CPC ...... B25J 15/12; B25J 15/0213; B25J 15/103; B25J 15/0009; B25J 15/0233; B25J 15/10; B25J 15/0004
See application file for complete search history.

(56) References Cited

U.S. PATENT DOCUMENTS 5,108,140 A * 4/1992 Bartholet ............. B25J 15/0009 294/115
5,501,498 A * 3/1996 Ulrich ................... F16D 43/218 294/111

(Continued)

FOREIGN PATENT DOCUMENTS

CN 102873689 A 1/2013
CN 107530887 A 1/2018

(Continued)

OTHER PUBLICATIONS

EP 2735406 B1-English Translation (Year: 2018).*

(Continued)

*Primary Examiner* — Stephen A Vu
(74) *Attorney, Agent, or Firm* — Greer Burns & Crain Ltd.

(57) ABSTRACT

A finger assembly of a robot hand includes a main frame, a tip portion rotatably connected to the main frame, and a band portion connected to the tip portion.

10 Claims, 12 Drawing Sheets

(56) References Cited

U.S. PATENT DOCUMENTS

| | | | | |
|---|---|---|---|---|
| 6,505,870 | B1 * | 1/2003 | Laliberte | B25J 15/0009 901/31 |
| 6,918,622 | B2 | 7/2005 | Kim et al. | |
| 8,424,942 | B2 * | 4/2013 | Park | B25J 15/0266 901/38 |
| 9,539,728 | B2 * | 1/2017 | Nammoto | B25J 15/0009 |
| 9,782,902 | B1 | 10/2017 | Kim et al. | |
| 10,259,122 | B2 | 4/2019 | Odhner et al. | |
| 2018/0117773 | A1 | 5/2018 | Odhner et al. | |

FOREIGN PATENT DOCUMENTS

| | | | |
|---|---|---|---|
| CN | 108247627 | A | 7/2018 |
| CN | 209936945 | U | 1/2020 |
| DE | 102006009559 | B3 | 5/2007 |
| EP | 2735406 | B1 | 4/2018 |
| JP | 59097882 | A | 6/1984 |
| JP | 2003275984 | A | 9/2003 |
| JP | 2010201538 | A | 9/2010 |
| JP | 2011240422 | A | 12/2011 |
| JP | 2019514710 | A | 6/2019 |
| KR | 101776818 | B1 | 9/2017 |
| KR | 1020170101549 | A | 9/2017 |
| KR | 1020180002950 | A | 1/2018 |

OTHER PUBLICATIONS

Office action issued in corresponding Chinese Patent Application No. 202180010216.4, dated Jun. 27, 2025.

EESR issued in European Patent Application No. 21748151.4, dated Jan. 22, 2024.

Office action issued in Korean patent application No. 10-2020-0011359, dated Mar. 7, 2023.

ISR issued in PCT/KR2021/001008, mailed Apr. 27, 2021.

* cited by examiner 220
230
430(450)
420
410
470
460
300
210
600
700
X
Z
Y

FINGER ASSEMBLY AND ROBOT HAND COMPRISING SAME

CROSS-REFERENCE TO RELATED APPLICATIONS

This is a continuation application of International Application No. PCT/KR2021/001008, filed Jan. 26, 2021, which claims the benefit of Korean Patent Application No. 10-2020-0011359, Jan. 30, 2020.

BACKGROUND OF THE INVENTION

Field of Invention

The disclosure relates to a robot apparatus, and more particularly, to a finger assembly and a robot hand including the same.

Description of Related Art

In general, a robot hand is provided in various apparatuses to perform various operations. Such a robot hand may include various link structures to realize a structure similar to a hand of a person.

When a link structure is used in a robot hand, the link structure may limit the operation range of the robot hand due to a limit to an operation range of the link structure, and thus it may not be easy to realize various movements.

As the robot industry is advanced, it is required to operate on objects having various outer surfaces, and it is very important to prevent damage to the objects by finely controlling force applied to the outer surfaces.

BRIEF SUMMARY OF THE INVENTION

Embodiments of the disclosure of the present invention provide a finger assembly and a robot hand including the same.

One aspect of the disclosure may provide a finger assembly including a main frame, a tip portion rotatably connected to the main frame, and a band portion connected to the tip portion.

According to embodiments of the disclosure, it is possible to grasp an object having various outer surfaces or shapes. Also, according to embodiments of the disclosure, it is possible to perform various operations because it is possible to grasp various objects.

According to embodiments of the disclosure, it is possible to realize an operation similar to a hand of a person.

According to an aspect of the disclosure, a finger assembly includes: a main frame; a tip portion rotatably connected to the main frame; and a band portion connected to the tip portion.

The band portion may be flexible.

One of the main frame or the tip portion may include an insertion portion, and the other one of the main frame or the tip portion may include a path guide portion into which the insertion portion is movably inserted and guiding the movement of the insertion portion.

The path guide portion may be curved in a form of a long hole.

According to another aspect of the disclosure, a robot hand includes: a body portion; and a finger assembly connected to the body portion, wherein the finger assembly includes a main frame rotatably connected to the body portion; a tip portion rotatably connected to an end of the main frame; and a band portion connected to the tip portion and connected to the body portion.

The robot hand may further include a band driving unit connected to the band portion and changing a location of a portion connected to the band portion.

There may be a plurality of the finger assemblies, wherein each finger assembly may be connected to the band driving unit.

The band driving unit may include: a driving unit arranged inside the body portion; a guide portion rotating by being connected to the driving unit; and a linear motion unit connected to the band portion and arranged in the guide portion to linearly move the guide portion.

There may be a plurality of the finger assemblies, and the body portion may include: a support portion to which one of the plurality of finger assemblies is rotatably connected; and a rotating portion rotatably connected to the support portion and to which another one of the plurality of finger assemblies is rotatably connected.

The robot hand may further include a rotation driving unit connecting the rotating portion and the support portion, and rotating the rotating portion.

The robot hand may further include a finger driving unit arranged in the body portion to be connected to the finger assembly, and rotating the finger assembly.

The band portion may be flexible.

One of the main frame or the tip portion may include an insertion portion, and the other one of the main frame or the tip portion may include a path guide portion into which the insertion portion is movably inserted and guiding the movement of the insertion portion.

DETAILED DESCRIPTION OF THE INVENTION

The disclosure will become apparent by referring to embodiments described below in detail with accompanying drawings. The embodiments of the disclosure may have different forms and should not be construed as being limited to the descriptions set forth herein. Rather, these embodiments are provided so that the disclosure will be thorough and complete and will fully convey the concept of the disclosure to one of ordinary skill in the art, and the disclosure will only be defined by the appended claims. Terms used herein are intended to describe embodiments and are not intended to limit the disclosure. In the present specification, an expression used in the singular encompasses an expression in the plural, unless it has a clearly different meaning in the context. Terms such as "comprises" and/or "comprising" used in the present specification are not intended to preclude the possibility that one or more other components, steps, operations, and/or devices may exist or may be added. While such terms as "first", "second", etc., may be used to describe various components, such components must not be limited to the above terms. The above terms are used only to distinguish one component from another.

Figure 1:
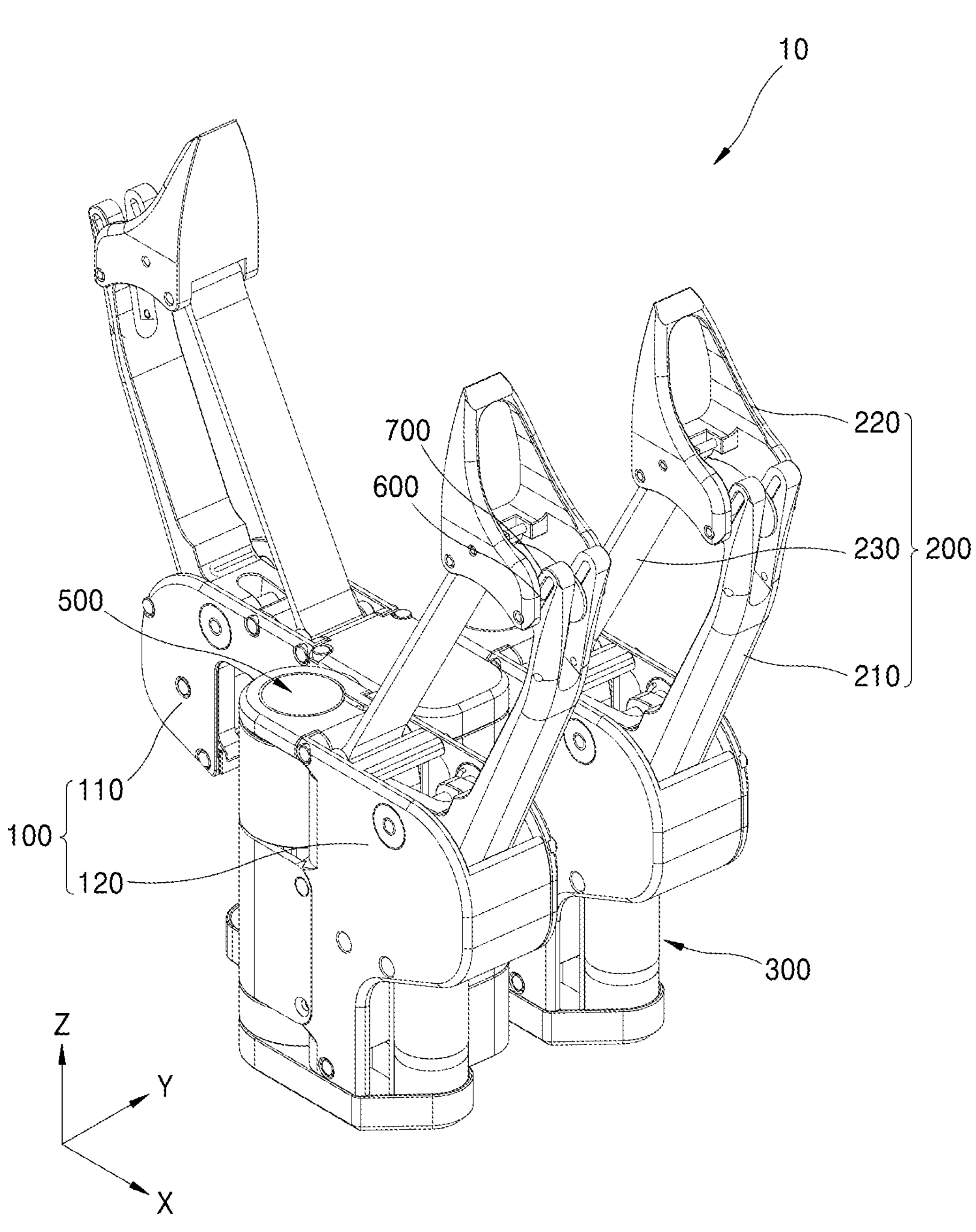
FIG. 1 is a perspective view of a robot hand according to an embodiment of the invention.

FIG. 1 is a perspective view of a robot hand according to an embodiment of the disclosure.

Referring to FIG. 1, a robot hand 10 may include a body portion 100, a finger assembly 200, a finger driving unit 300, a band driving unit 400 (shown in FIG. 2), and a rotation driving unit 500.

The body portion 100 may be connected to a robot or the like (not shown). Here, the body portion 100 may be rotatably connected to the robot or the like, or may be fixed to the robot or the like. The body portion 100 may include a support portion 110 connected to the robot or the like, and a rotating portion 120 rotatably connected to the support portion 110. In this case, there may be at least one rotating portion 120. When there is a plurality of the rotating portions 120, the rotating portions 120 may simultaneously rotate by being connected to the support portion 110.

The body portion 100 may be connected to at least one finger assembly 200. When there is a plurality of the finger assemblies 200, the plurality of finger assemblies 200 may be spaced apart from each other. In FIG. 1, two adjacent and one opposing finger assemblies are shown, as an example. The plurality of finger assemblies 200 may grasp an object. In this case, one of the plurality of finger assemblies 200 may be rotatably connected to the support portion 110, and another one of the plurality of finger assemblies 200 may be rotatably connected to the rotating portion 120. Here, the other one of the plurality of finger assemblies 200, which is connected to the rotating portion 120, may simultaneously rotate around the body portion 100 while the rotating portion 120 rotates.

The finger assembly 200 may include a main frame 210, a tip portion 220, and a band portion 230. The main frame 210 may be rotatably connected to the body portion 100. In this case, the main frame 210 may have a structure in which a plurality of frames are connected to each other. The tip portion 220 may be rotatably connected to the main frame 210. One surface of the tip portion 220 may be flat. One of the tip portion 220 and the main frame 210 may include an insertion portion 600. Also, the other one of the tip portion 220 or the main frame 210 may include a path guide portion 700. The insertion portion 600 may move by being inserted into the path guide portion 700, and the path guide portion 700 may guide the movement of the insertion portion 600. In this case, the insertion portion 600 may have a projection shape protruding from an outer surface of one of the tip portion 220 or the main frame 210, and the path guide portion 700 may have an elongated hole or a slot. Hereinafter, for convenience of description, a case in which the tip portion 220 includes the insertion portion 600 and the main frame 210 includes the path guide portion 700 will be mainly described in detail.

The band portion 230 may be connected to the tip portion 220 to change the position of the tip portion 220. In this case, one side surface among one end of the tip portion 220 may be rotatably connected to the main frame 210 as described above, and another side surface among the one end of the tip portion 220 may be connected to the band portion 230. Here, the band portion 230 may be flexible. For example, the band portion 230 may be in a form in which synthetic resin and natural fiber are mixed. In particular, the band portion 230 may have a certain level of strength such that the shape thereof may be changed but not stretched. The band portion 230 is connected to the band driving unit 400, and a position of one surface of the tip portion 220 may be changed according to the movement of the band driving unit 400.

The finger driving unit 300 may be arranged at the body portion 100 to be connected to one finger assembly 200. Here, the finger driving unit 300 may rotate the finger assembly 200.

The band driving unit 400 may be connected to the band portion 230 to change the location of a portion of the band driving unit 400, which is connected to the band portion 230.

The rotation driving unit 500 may connect the support portion 110 and the rotating portion 120. The rotation driving unit 500 may rotate the rotating portion 120.

Referring to operations of the robot hand 10 described above, various objects may be grasped by using the robot hand 10. In detail, the robot hand 10 may grasp an object having an even surface or an object having an uneven surface, such as a curved surface.

For example, the robot hand 10 may support an object by only using the tip portion 220. In this case, an interval between the finger assemblies 200 may be adjusted by operating the rotation driving unit 500. For example, when the rotation driving unit 500 is operated, each finger assembly 200 may rotate based on the body portion 100, and thus an interval between the tip portion 220 of one of the two adjacent finger assemblies and the tip portion 220 of the opposing finger assembly 200 may be increased or decreased. When an object is grasped, the rotation driving unit 500 may increase the interval between the tip portion 220 of one of the two adjacent finger assemblies and the tip portion 220 of the opposing finger assembly 200. Then, the finger driving unit 300 may be operated to enlarge a space between the tip portions 220 of the finger assemblies 200 to correspond to the surface size of the object. Here, a separately provided LiDAR, camera, or the like (not shown) may be used to determine the type of the object or measure the surface of the object, and control described above may be performed based on the result of the determination or measurement.

Figure 2:
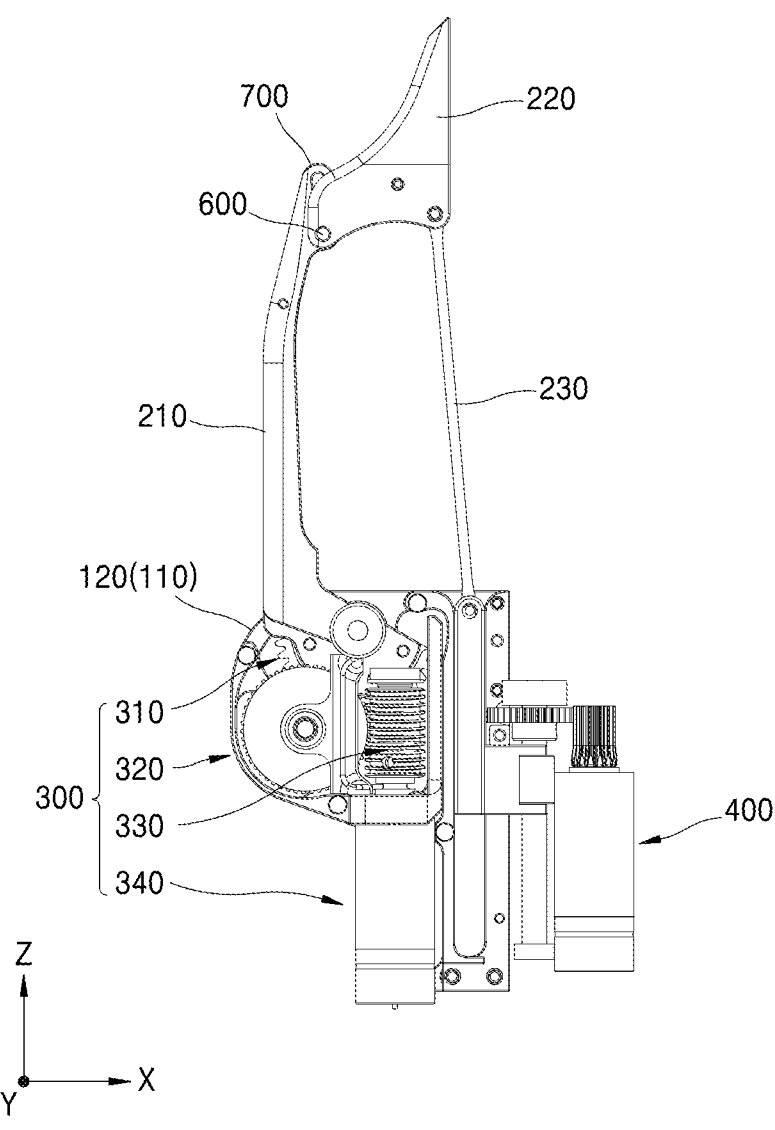
FIG. 2 is an elevational view of a finger assembly of the robot hand of FIG. 1.

After such operations are performed or while such operations are performed, the band driving unit 400 may be operated such that the flat surface of the tip portion 220 of the finger assembly 200 is arranged as shown in FIG. 2. In this case, the flat surface of the tip portion 220 may be arranged perpendicular to the flat top surface of the body portion 100.

When the above processes are completed, operations of the finger driving unit 300 and band driving unit 400 may be controlled to adjust the space between the tip portions 220, thereby grasping the object. At this time, the band driving unit 400 may change the length of the band portion 230 protruding from the body portion 100 such that the flat surface of the tip portion 220 is arranged as described above, according to the operations of the finger driving unit 300. In this case, a portion of the body portion 100, into or from which the band portion 230 is inserted or extracted, may be curved so as to reduce friction between the band portion 230 and the body portion 100 when the band portion 230 is inserted or extracted.

In particular, when the tip portions 220 grasp the object, the surface of the object contacted by the tip portions 220 may be uniform. When the object is a hexahedral, the flat surface of the tip portions 220 may be maintained parallel to the surface of the object so as to maximize grasping power for the object. When the object is cylindrical, the flat surface of the tip portions 220 is the same as a surface where a tangent line is arranged on an outer surface of the object, and thus the object may be prevented from slipping from the flat surface of the tip portion 220.

In addition, the robot hand 10 may grasp an object having an uneven surface. In this case, the surface of the object may contact an outer surface of the band portion 230 of the finger assembly 200. Here, to grasp the object, the location of each finger assembly 200 may be adjusted by controlling the rotation driving unit 500, the finger driving unit 300, and the band driving unit 400. Then, when the object is completely inserted into spaces between the plurality of finger assemblies 200, the finger driving unit 300 and the band driving unit 400 may be controlled to grasp the object.

In detail, when the finger driving unit 300 is operated, the main frame 210 may rotate such that the main frame 210 approaches the outer surface of the body portion 100. In this case, an outer surface of the band portion 230 may contact the surface of the object. Here, the band driving unit 400 may operate to adjust the position of the tip portion 220.

When the surface of the object contacts the band portion 230 as described above, the shape of the band portion 230 may change to correspond to the surface of the object. In this case, the band driving unit 400 may adjust the length of the band portion 230 extracted from the body portion 100, such that the band portion 230 is extracted from or inserted into the body portion 100.

Also, the tip portion 220 may rotate based on the main frame 210 according to the operation of the band driving unit 400, and the flat portion of the tip portion 220 may face an outer surface of the object. In this case, the flat portion of the tip portion 220 may face another finger assembly 200 or face a top surface of the body portion 100 in FIG. 1. The insertion portion 600 may assist with a free position change of the tip portion 220 by freely moving on the path guide portion 700. Here, the movements of the tip portions 220 described above may be simultaneously performed at the plurality of finger assemblies 200. When the finger driving unit 300 does not operate, the changing degree of the shape of the band portion 230 varies depending on the uneven surface of the object, and thus the positions of the tip portions 220 of the finger assemblies 200 may also be different from each other.

Accordingly, it is possible for the robot hand 10 to freely grasp an object having an uneven outer surface. Also, it is possible for the robot hand 10 to grasp an object having an even surface, through the tip portion 220.

The robot hand 10 may improve the operation performance by operating according to various objects. In addition, the robot hand 10 may prevent damage to an object when grasping the object, as force applied by the band portion 230 to the object is distributed according to the shape of the surface of the object.

Hereinafter, each component of the robot hand 10 will be described in detail.

Figure 3:
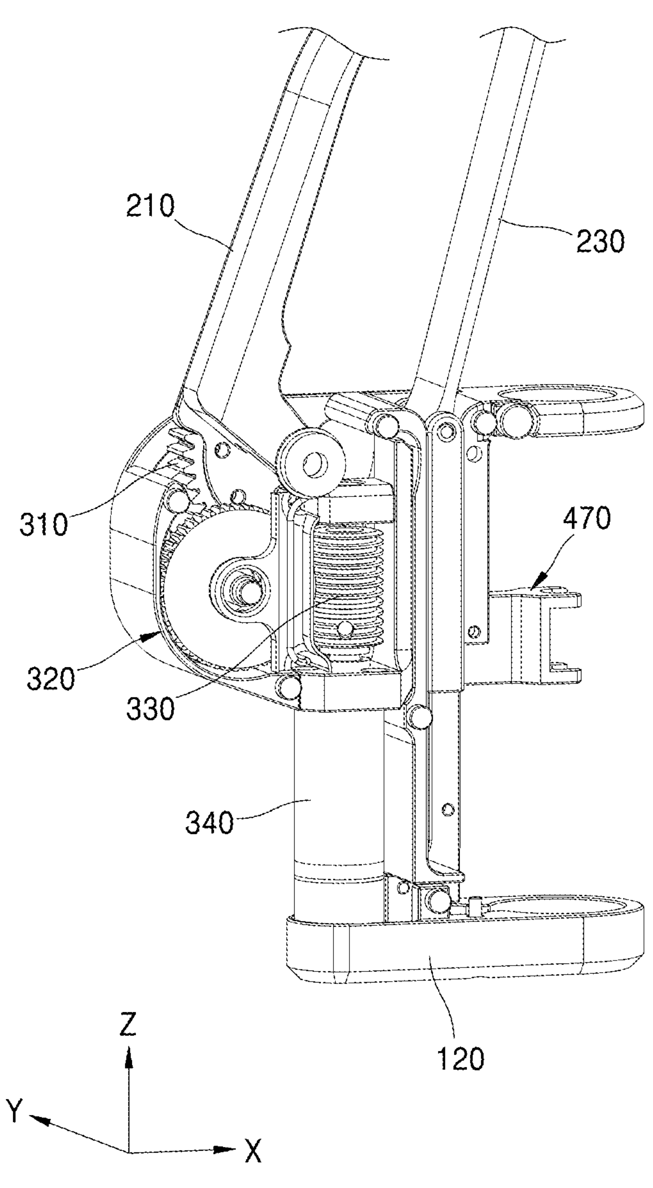
FIG. 3 is a perspective view of a part of the finger assembly of FIG. 2.

FIG. 2 is an elevational view of the finger assembly 200 of the robot hand 10 of FIG. 1. FIG. 3 is a perspective view of a part of the finger assembly 200 of FIG. 2.

Referring to FIGS. 2 and 3, the finger assembly 200 may be connected to the finger driving unit 300. Here, the finger driving unit 300 may be arranged inside the support portion 110 or the rotating portion 120. When there is a plurality of finger assemblies 200, a plurality of the finger driving units 300 may be provided to independently drive the finger assemblies 200. In this case, the finger driving units 300 may each be individually connected to a corresponding finger assembly 200.

The finger driving unit 300 may include a first finger driving gear 310 connected to the finger assembly 200, a second finger driving gear 320 connected to the first finger driving gear 310, a third finger driving gear 330 connected to the second finger driving gear 320, and a first driving unit 340 connected to the third finger driving gear 330. The first finger driving gear 310 may be fixed to the main frame 210 or may be integrated to an outer surface of the main frame 210. In this case, the first finger driving gear 310 may be formed in a fan shape such that the main frame 210 operates within a uniform rotation angle range. In this case, the first finger driving gear 310 may include a stopper to prevent the main frame 210 from deviating from the rotation angle range. The stopper may have a projection that protrudes into the body portion 100. In this case, a groove into which the stopper is inserted may be formed on an inner surface of the body portion 100 to limit the rotation angle of the stopper.

The second finger driving gear 320 may be connected to the first finger driving gear 310. Here, the second finger driving gear 320 may transmit driving force to the first finger driving gear 310. In this case, the second finger driving gear 320 may include at least one gear. For example, the second finger driving gear 320 may include a first gear (not shown) and a second gear (not shown), which are connected to each other. The first gear may be connected to the first finger driving gear 310, and the second gear may be connected to the third finger driving gear 330.

The third finger driving gear 330 may transmit driving force to the second finger driving gear 320. In this case, the third finger driving gear 330 and the second finger driving gear 320 may be arranged such that rotation shafts thereof are in different directions. The third finger driving gear 330 may be formed in a helical gear shape and the second finger driving gear 320 may be formed in a spur gear shape.

The first driving unit 340 may rotate the third finger driving gear 330. Here, the first driving unit 340 may include a motor. According to another embodiment, the first driving unit 340 may include a motor and a reducer.

Referring to operations of the finger driving unit 300, the first driving unit 340 may operate to rotate the third finger driving gear 330. The third finger driving gear 330 may rotate the second finger driving gear 320, and the second finger driving gear 320 may rotate the first finger driving gear 310.

The main frame 210 may rotate according to the rotation of the first finger driving gear 310. Here, a rotation direction of the main frame 210 may vary depending on the rotation direction of the rotation shaft of the first driving unit 340, according to an operation of the first driving unit 340.

When the finger driving unit 300 operates as such, an angle formed by the main frame 210 and an outer surface of the support portion 110 or rotating portion 120 may vary. In other words, the main frame 210 may approach or move away from one surface of the support portion 110 or rotating portion 120, according to the operation of the finger driving unit 300. In particular, when there is a plurality of finger assemblies 200, the object may be grasped or released according to the operation of the finger driving unit 300.

Figure 4:
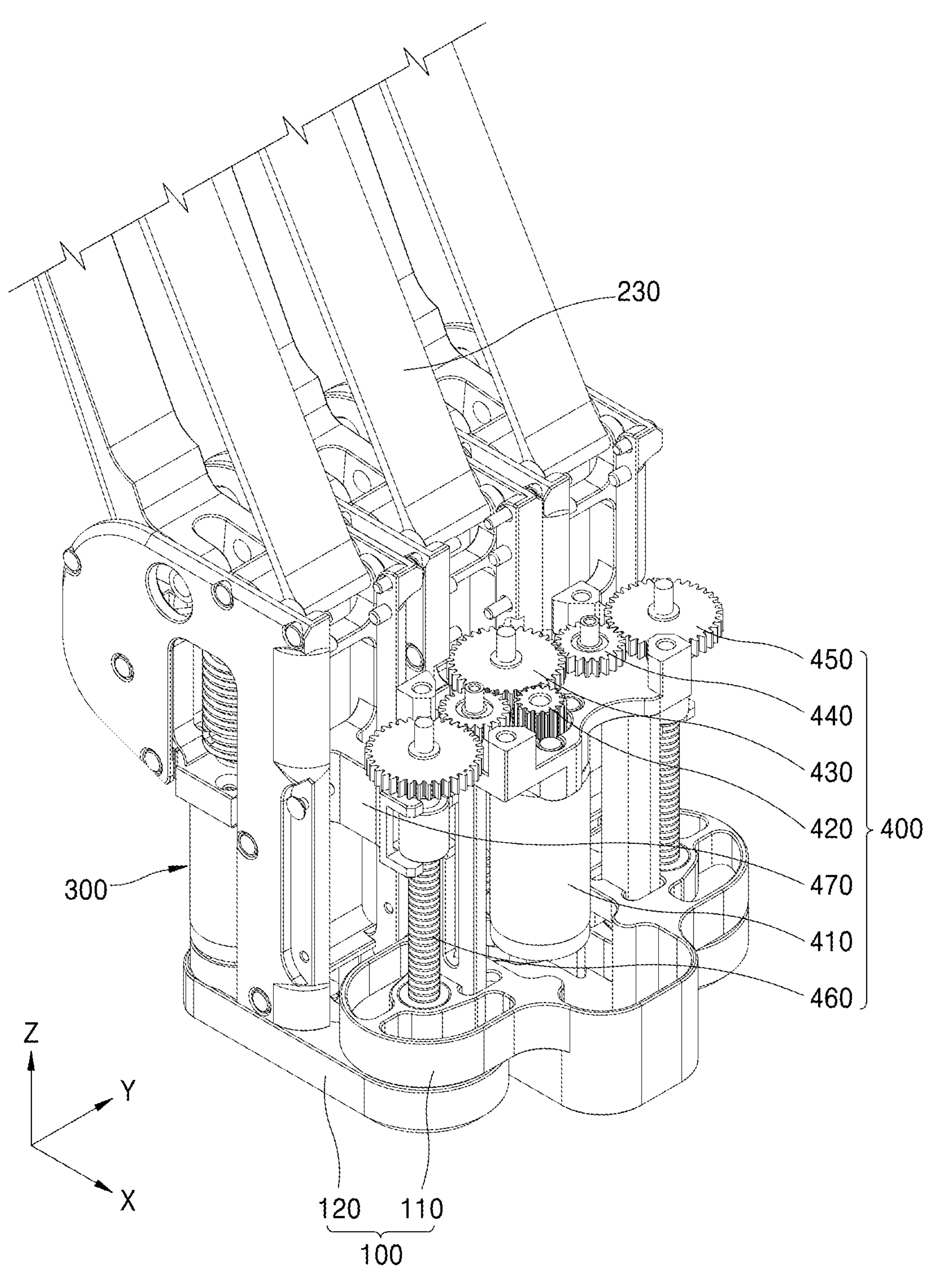
FIG. 4 is a perspective view of a band driving unit of the robot hand of FIG. 1.
Figure 5:
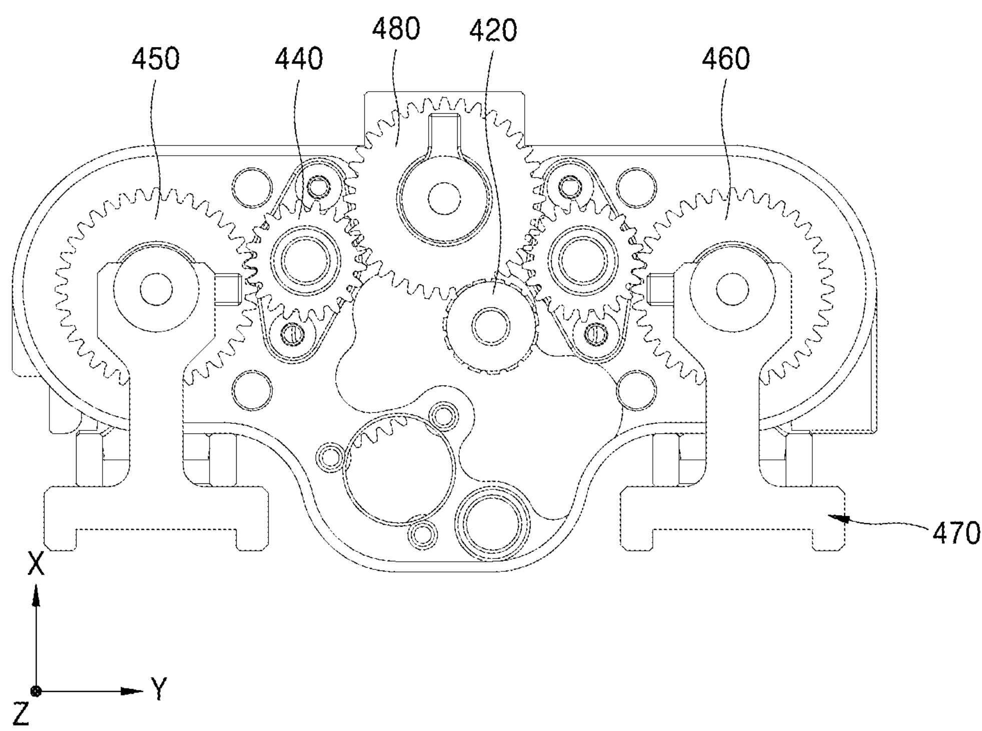
FIG. 5 is a plan view of the band driving unit of the robot hand of FIG. 4.
Figure 6:
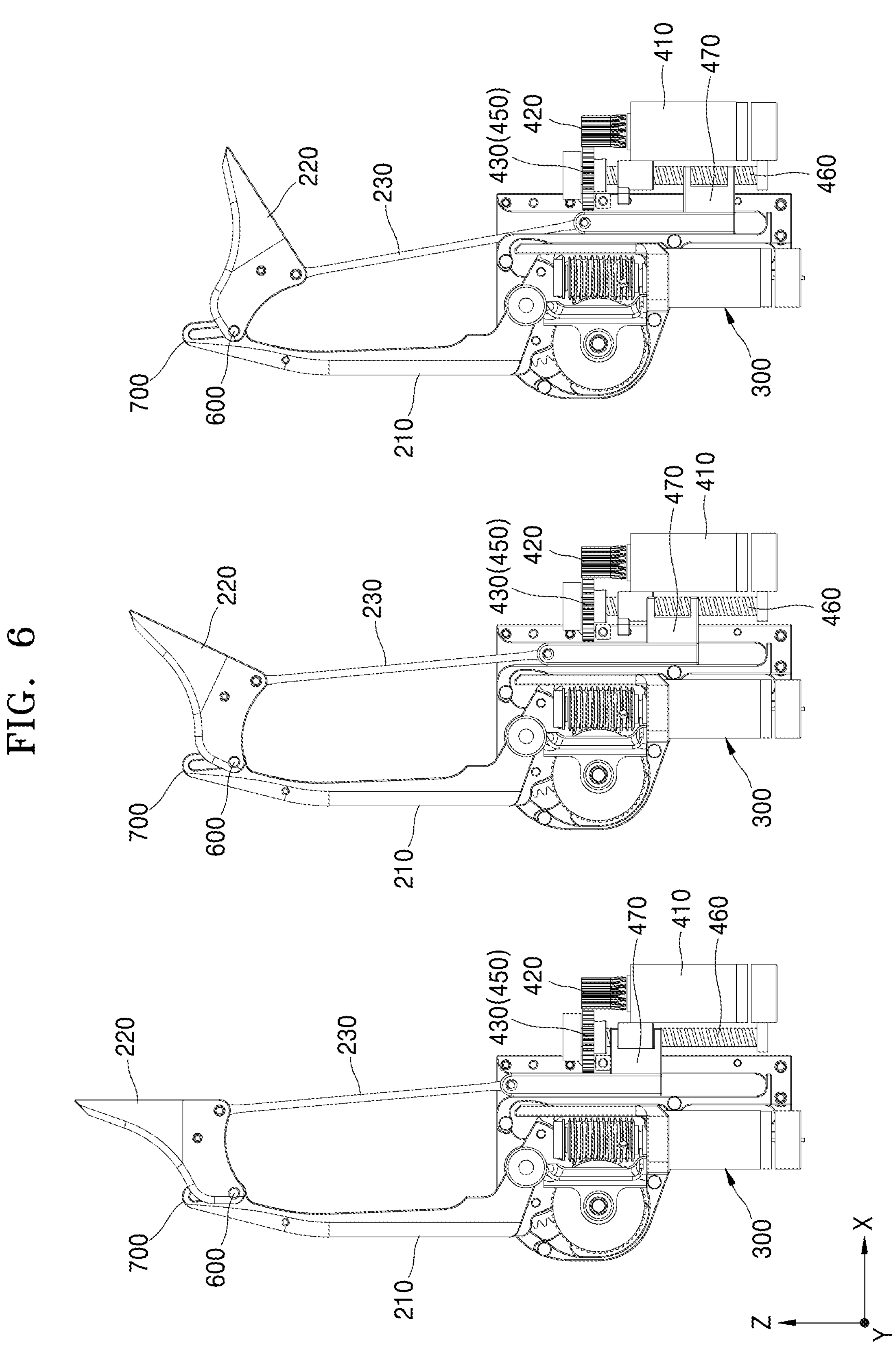
FIG. 6 is an illustration of the operations of the finger assembly of the robot hand of FIG. 2.

FIG. 4 is a perspective view of the band driving unit 400 of the robot hand of FIG. 1. FIG. 5 is a plan view of the band driving unit 400 of FIG. 4. FIG. 6 is illustrate the operations of the finger assembly 200 of the robot hand of FIG. 2. Referring to FIGS. 4 through 6, the band driving unit 400 may adjust the length of the band portion 230 of at least one finger assembly 200, which is extracted outside the body portion 100. In particular, one band driving unit 400 may be provided to simultaneously adjust lengths of the band portions 230 of a plurality of finger assemblies 200.

The band driving unit 400 may be arranged inside the support portion 110. In detail, the band driving unit 400 may include a second driving unit 410, a first band driving gear 420, a second band driving gear 430, a third band driving gear 440, a fourth band driving gear 450, a guide portion 460, and a linear motion unit 470.

The second driving unit 410 may be the same as or similar to the first driving unit 340 of the finger driving unit 300 described above, and thus detailed descriptions thereof will be omitted.

The first band driving gear 420 may be connected to the second driving unit 410. The second band driving gear 430 may be connected to the first band driving gear 420, and connected to the guide portion 460 connected to one of the plurality of finger assemblies 200.

The third band driving gear 440 may be connected to the second band driving gear 430, and may be connected to the fourth band driving gear 450. Here, the fourth band driving gear 450 may be connected to the guide portion 460 of another one of the finger assemblies 200, which is different from the one of the finger assemblies 200, which is connected to the second band driving gear 430. In this case, the third band driving gear 440 may not only transmit rotational force of the second band driving gear 430 to the fourth band driving gear 450, but also match the rotating speed of the second band driving gear 430 and the rotating speed of the fourth band driving gear 450 to be identical.

The guide portion 460 may be connected to the second band driving gear 430 or the fourth band driving gear 450. Here, a screw may be formed on an outer surface of the guide portion 460. In this case, the guide portion 460 may be rotatably connected to the support portion 110 to rotate according to rotation of the fourth band driving gear 450 or the second band driving gear 430.

The linear motion unit 470 may linearly move in a length direction of the guide portion 460, along the guide portion 460 according to the rotation of the guide portion 460. In this case, a moving direction of the linear motion unit 470 may vary according to the rotation direction of the guide portion 460. For example, the linear motion unit 470 may move up and down the guide portion 460 according to the rotation direction of the guide portion 460 in FIG. 4. A plurality of the linear motion units 470 may be provided, and one end of the band portion 230 of the finger assembly 200 may be connected to each linear motion unit 470, and thus the one end of the band portion 230 may also move according to the movement of the linear motion unit 470.

The position of the tip portion 220 with respect to the main frame 210 may change according to such movement of the band driving unit 400. For example, when the band driving unit 400 is operated without moving the main frame 210, the tip portion 220 may rotate based on a portion connected to the main frame 210. At this time, the insertion portion 600 may move along the path guide portion 700, and the direction facing the flat portion of the tip portion 220 may be changed.

In detail, when the second driving unit 410 rotates, the first band driving gear 420 may rotate to rotate the second band driving gear 430. In this case, the guide portion 460 connected to the second band driving gear 430 may rotate and the linear motion unit 470 may move, thereby changing the position of the tip portion 220 of one of the plurality of finger assemblies 200.

In addition, when the second band driving gear 430 rotates as described above, the third band driving gear 440 and the fourth band driving gear 450 may sequentially rotate at the same time. Here, the guide portion 460 connected to the fourth band driving gear 450 may rotate according to the rotation of the fourth band driving gear 450, and the linear motion unit 470 may linearly move. In this case, the position of the tip portion 220 of another one of the plurality of finger assemblies 200 may change.

At this time, one end of each of the band portions 230 of the finger assemblies 200, which are connected to the linear motion units 470, may be linearly moved such that the tip portions 220 of the finger assemblies 200, which are connected to the other end of each of the band portions 230, simultaneously maintain the same positions.

The band driving unit 400 described above may be arranged at the support portion 110 so as not to be affected by the rotation of the main frame 210 and the rotation of the rotating portion 120.

Figure 7:
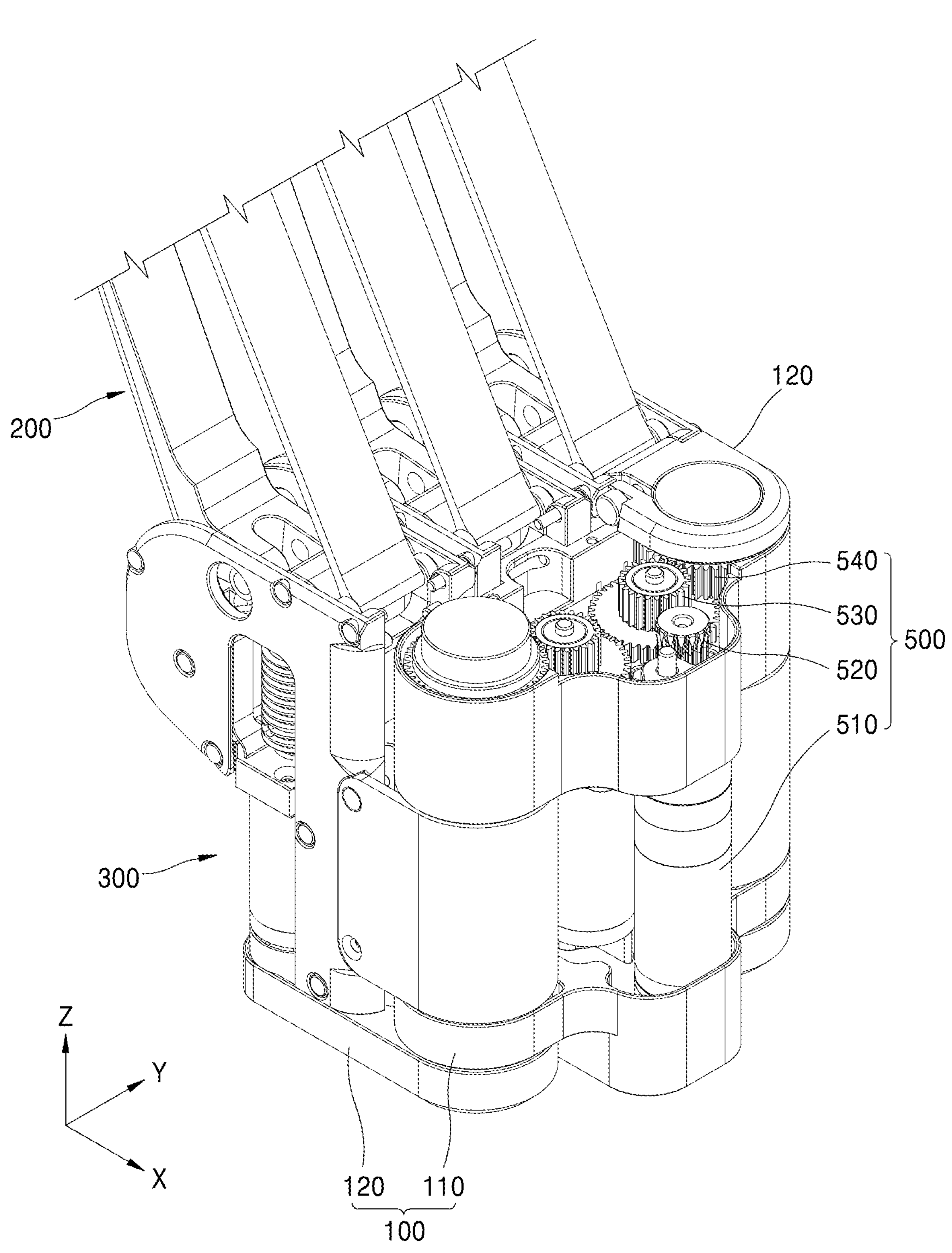
FIG. 7 is a perspective view of a rotation driving unit of the robot hand of FIG. 1.
Figure 8:
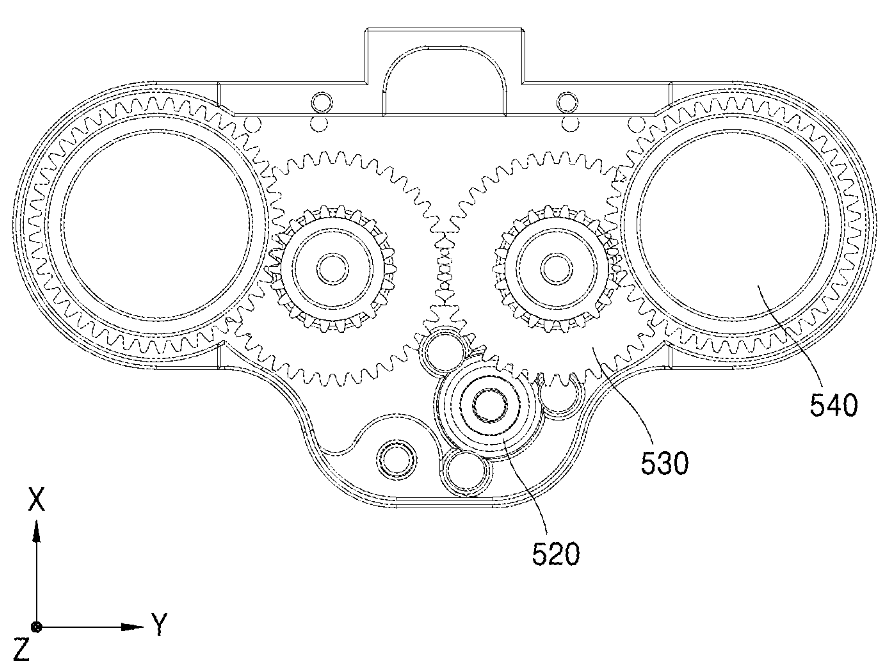
FIG. 8 is a plan view of the rotation driving unit of the robot hand of FIG. 7.

FIG. 7 is a perspective view of the rotation driving unit 500 of the robot hand of FIG. 1. FIG. 8 is a plan view of the rotation driving unit 500 of the robot hand of FIG. 7.

Referring to FIGS. 7 and 8, the rotation driving unit 500 may rotate the rotating portion 120 based on the support portion 110. When a plurality of the rotating portions 120 are provided, the rotation driving unit 500 may simultaneously rotate the plurality of rotating portions 120, based on the corresponding support portion 110.

The rotation driving unit 500 may include a third driving unit 510, a first rotation driving gear 520, a second rotation driving gear 530, and a third rotation driving gear 540. The third driving unit 510 is the same as or similar to the first driving unit 340 of the finger driving unit 300 described above, and thus detailed descriptions thereof will be omitted.

The first rotation driving gear 520 may rotate by being connected to the third driving unit 510. Here, the first rotation driving gear 520 may be rotatably arranged at the support portion 110.

The second rotation driving gear 530 may be connected to the first rotation driving gear 520, and rotatably arranged at the support portion 110. The second rotation driving gear 530 may be a multi-stage gear, and rotate according to the rotation of the first rotation driving gear 520. For example, a gear arranged at a bottom portion of the second rotation driving gear 530 may contact the first rotation driving gear 520, and a gear arranged at a top portion of the second rotation driving gear 530 may contact the third rotation driving gear 540.

The third rotation driving gear 540 may be connected to the second rotation driving gear 530, and rotatably arranged at the support portion 110. Here, the rotating portion 120 may be fixed to one end of the third rotation driving gear 540. In this case, a plurality of the third rotation driving gears 540 may each be provided to be connected to the rotating portion 120.

The rotation driving unit 500 may operate when the rotating portion 120 described above rotates. In detail, when the third driving unit 510 operates, the third driving unit 510 may rotate the first rotation driving gear 520.

When the first rotation driving gear 520 rotates, the third rotation driving gear 540 may be rotated through the second rotation driving gear 530. When the third rotation driving gear 540 rotates, the rotating portion 120 connected to the third rotation driving gear 540 may rotate based on the support portion 110.

In this case, the plurality of rotating portions 120 rotate based on the support portion 110, thereby changing the distance between the support portion 110 and each finger assembly 200 arranged at each rotating portion 120. In other words, the plurality of rotating portions 120 may rotate clockwise or counterclockwise, based on the support portion 110.

Figure 9:
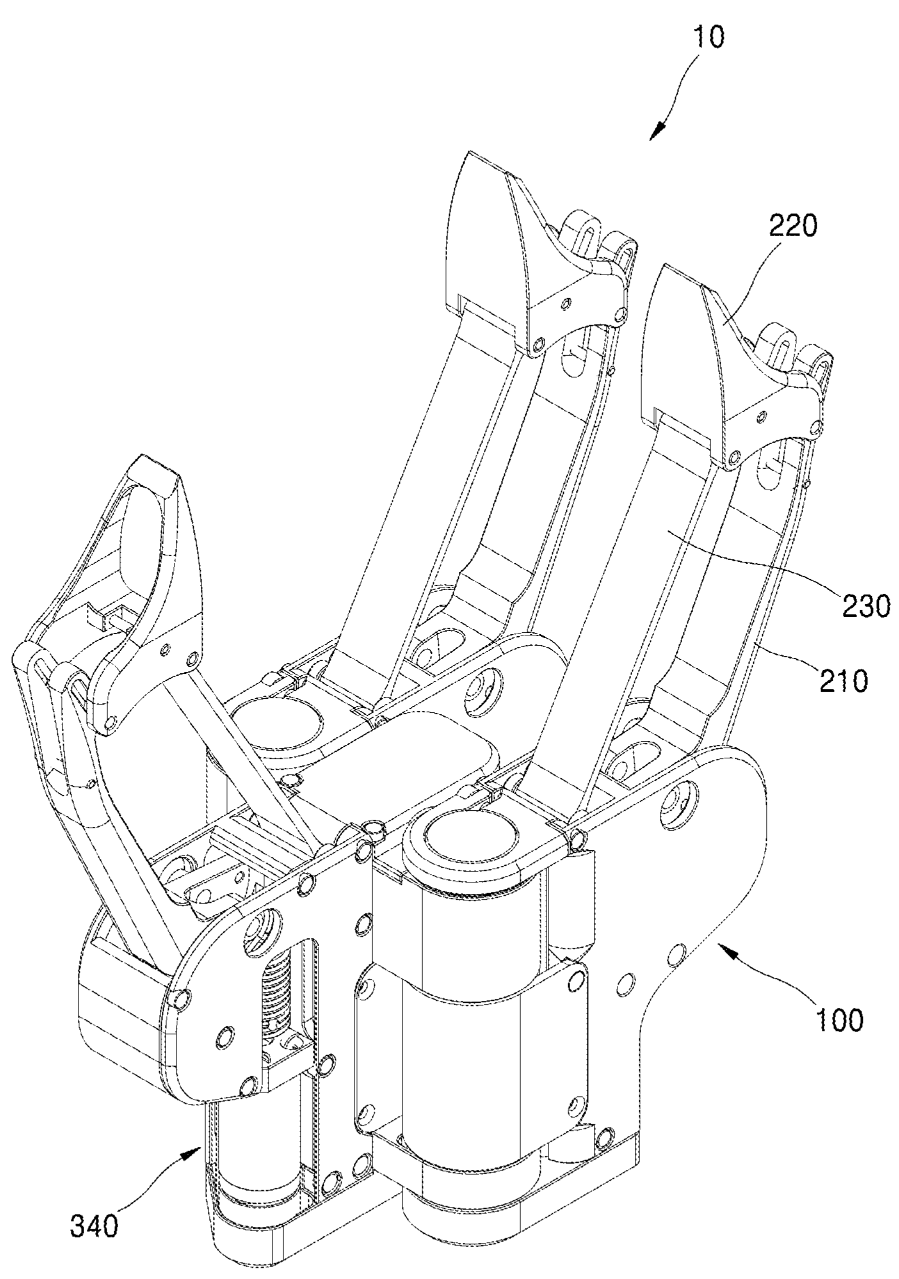
FIG. 9 is another perspective view of the robot hand of FIG. 1.
Figure 10:
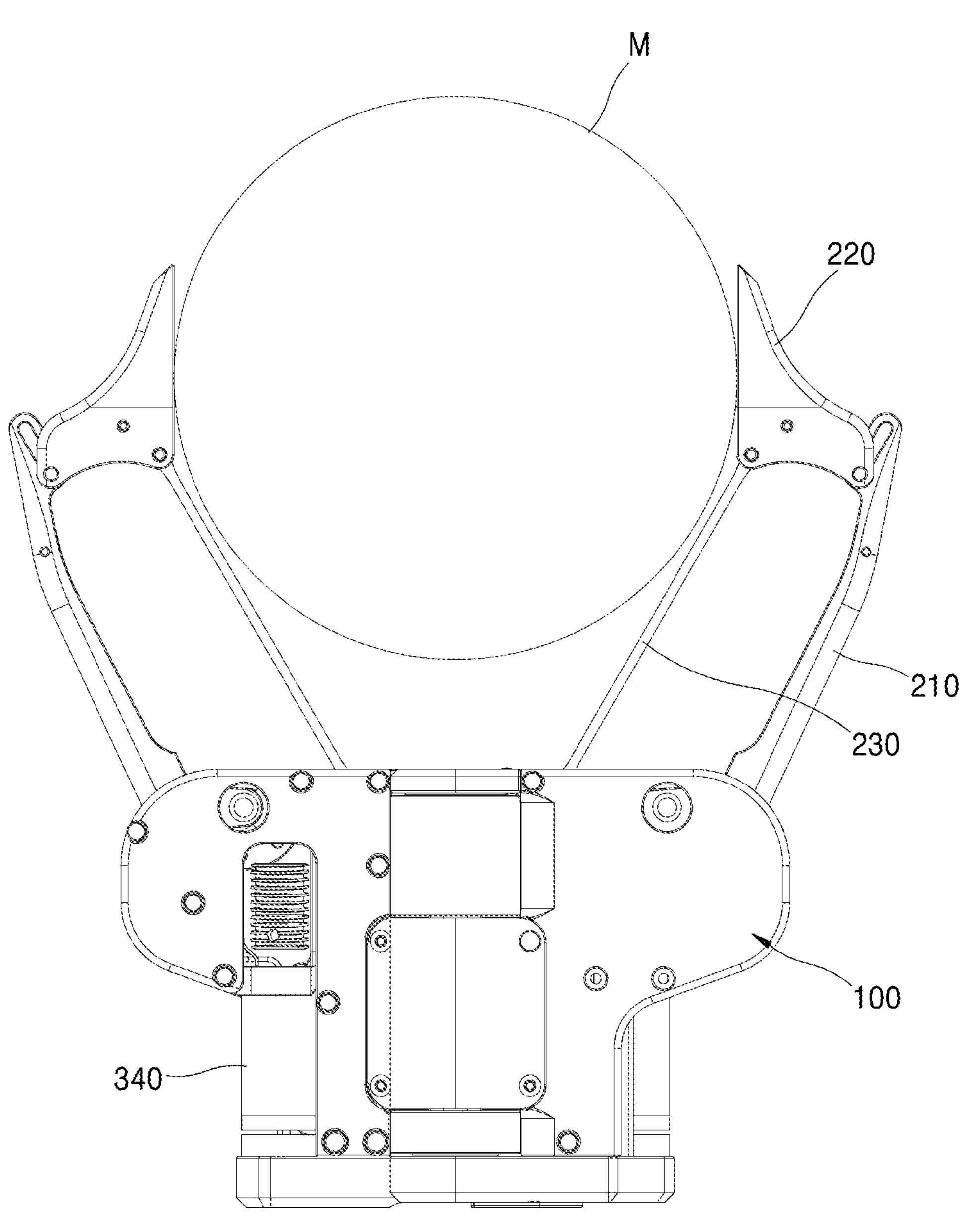
FIG. 10 is an elevational view of a part of the robot hand of FIG. 9 shown holding an object.

FIG. 9 is another perspective view of the robot hand of FIG. 1. FIG. 10 is an elevational view of a part of the robot hand of FIG. 9. Hereinafter, for convenience of description, like reference numerals in FIG. 6 denote like elements.

Referring to FIGS. 9 and 10, the robot hand 10 may grasp an object M. The robot hand 10 may grasp the object M in various methods.

For example, the robot hand 10 may grasp the object M through the tip portion 220. In this case, the robot hand 10 may operate the first driving unit 340, based on a signal input. The signal input from the outside may include information about the size, shape, and the like of the object M. When the first driving unit 340 operates, the main frame 210 may rotate. At this time, the separated main frames 210 may move close to or away from each other. An interval between the main frames 210 may be adjusted such that a space for inserting the object M is secured.

In this case, the second driving unit 410 may operate to arrange the plurality of tip portions 220 such that one surface of each of the tip portions 220 arranged at the object M are parallel to each other. So as to align the locations of the tip portions 220 as such, a length of the band portion 230 extracted from the body portion 100 may be adjusted according to the operations of the second driving unit 410.

When the opposing finger assemblies 200 grasp the object M, the object M may be grasped as shown in FIG. 10.

Figure 11:
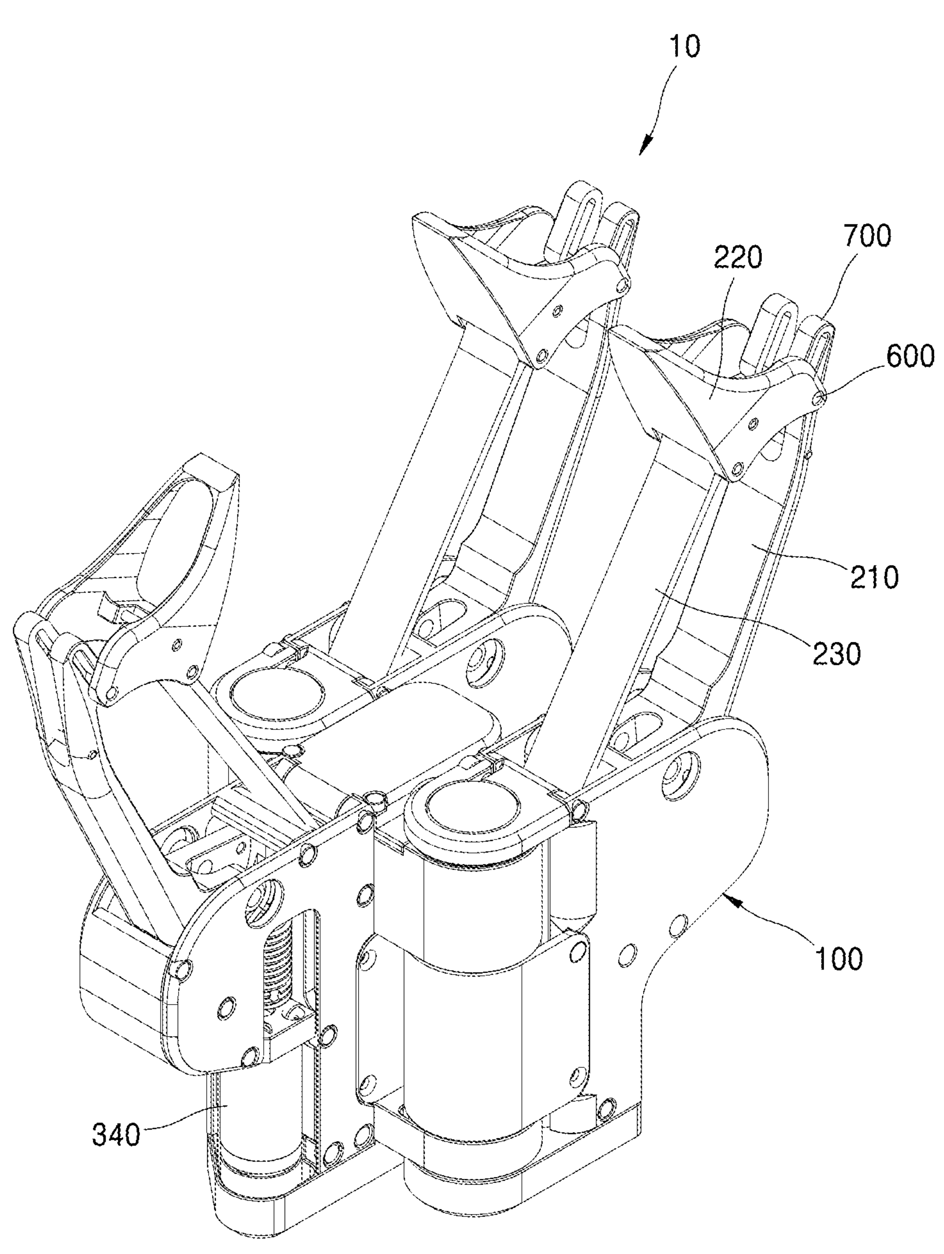
FIG. 11 is a perspective view of an operation of the robot hand of FIG. 1.
Figure 12:
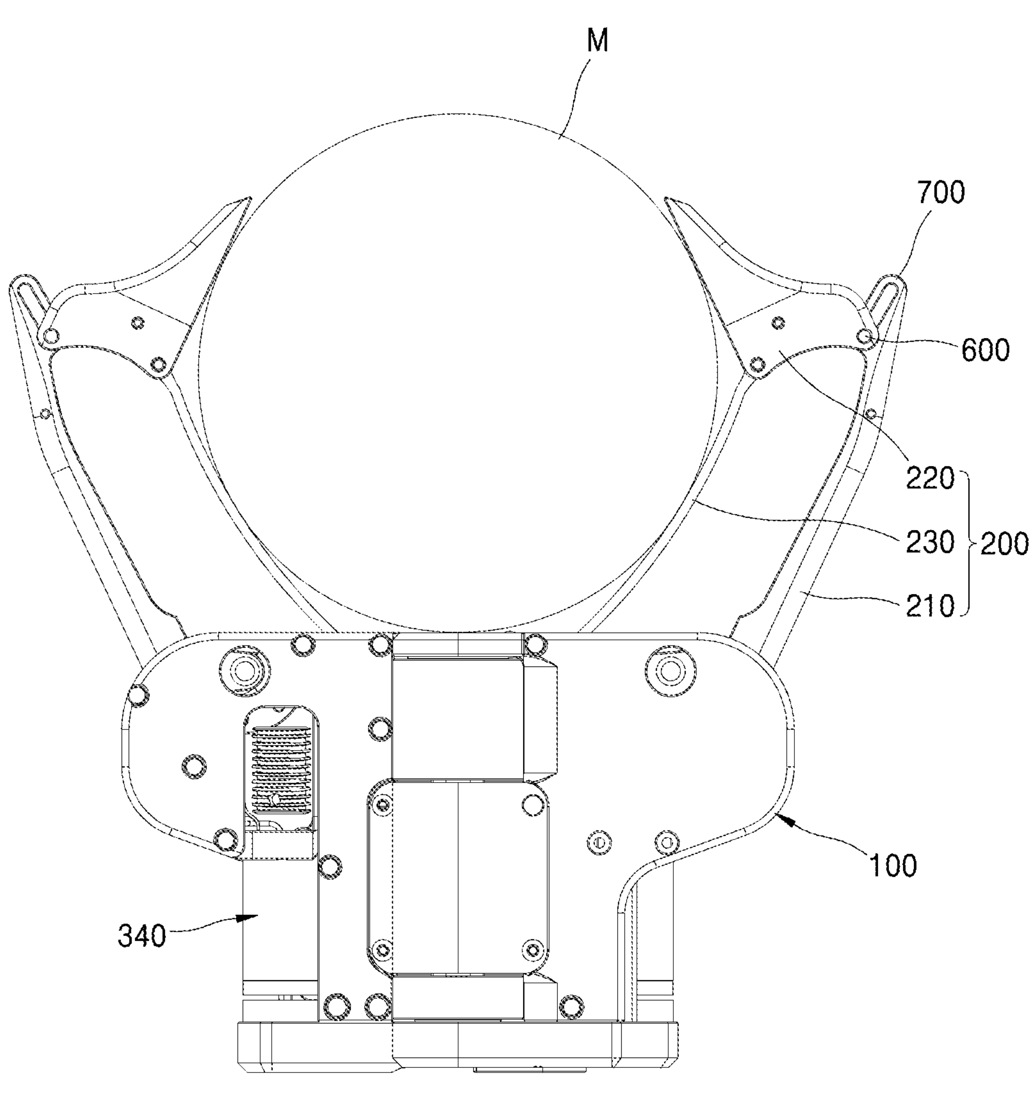
FIG. 12 is an elevational view of a part of the robot hand of FIG. 11.

FIG. 11 is another perspective view of the robot hand of FIG. 1. FIG. 12 is a cross-sectional view of a part of the robot hand of FIG. 11. Hereinafter, for convenience of description, like reference numerals in FIG. 6 denote like elements.

Referring to FIGS. 11 and 12, it is possible for the robot hand 10 to grasp the object M through the tip portions 220 and the band portions 230.

In detail, when the band portions 230 are continuously inserted into the body portion 100 after the tip portions 220 grasp the object M, the tip portions 220 may rotate while linearly moving along the path guide portions 700. In detail, the insertion portions 600 may linearly move along the path guide portions 700 while rotating at the path guide portions 700 according to the location of the object M.

When the tip portions 220 move as such, the object M may move towards the band portions 230 from the tip portions 220 and contact both the tip portions 220 and band portions 230. When the object M contacts the band portions 230, an outer surface of the band portions 230 may contact an outer surface of the object M, and thus have a shape similar to a shape of the outer surface of the object M. For example, when the object M is rounded as shown in FIG. 12, the outer surface of the band portions 230 may be rounded to correspond to the curved surface of the object M.

When the linear motion unit 470 continuously moves, the tip portions 220 may completely rotate as shown in FIG. 12 to contact a top portion of the object M. Here, the shape of the band portions 230 may change to correspond to the outer surface of the object M. In this case, the object M may be completely fixed inside the finger assemblies 200 by the tip portions 220, the band portions 230, and the body portion 100.

Accordingly, it is possible for the robot hand 10 to grasp the object M having various outer surfaces. Also, it is possible for the robot hand 10 to grasp the object M having an uneven surface, through a simple structure.

Although the disclosure has been described in connection with the above-mentioned embodiments, it is possible to make various modifications or changes without departing from the scope of the disclosure. Accordingly, the scope of appended claims will include such modifications or changes that belong to the gist of the disclosure.

According to an embodiment of the disclosure, a finger assembly and a robot hand, which are provided in a robot or the like, may be used to grasp objects of various shapes, and embodiments of the disclosure may be applied to a home robot, an industrial robot, or the like.

The invention claimed is:

1. A finger assembly of a robot hand comprising:
a pivotable main frame;
a tip portion rotatably connected near a distal end of the main frame and rotatable relative to the main frame; and
a flexible band portion connected at a first end to the tip portion and a second end near a base of the main frame for pivoting the tip portion independently of the main frame.

2. The finger assembly of claim 1, wherein a first one of the main frame or the tip portion comprises an insertion portion, and
a second one of the main frame or the tip portion comprises a path guide portion into which the insertion portion is movably inserted for guiding a movement of the insertion portion.

3. The finger assembly of claim 2, wherein the path guide portion is in a form of an elongated hole.

4. A robot hand comprising:
a body portion; and
at least one finger assembly connected to the body portion,
wherein the at least one finger assembly comprises:
a pivotable main frame rotatably connected to the body portion;
a tip portion rotatably connected near a distal end of the main frame and rotatable relative to the main frame; and
a flexible band portion connected at a first end to the tip portion and a second end connected to a band driving unit provided in the body portion for rotating the tip portion independently of the main frame.

5. The robot hand of claim 4, comprising a plurality of finger assemblies, and
each of the finger assemblies is connected to the band driving unit.

6. The robot hand of claim 4, wherein the band driving unit comprises:
a driving unit arranged inside the body portion;
a guide portion configured to be rotated by the driving unit; and a linear motion unit connected to the band portion and arranged in the guide portion to linearly move the guide portion.

7. The robot hand of claim 4, further comprising a plurality of finger assemblies, and the body portion comprises:

a support portion to which one of the plurality of finger assemblies is rotatably connected; and a rotating portion rotatably connected to the support portion and to which another one of the plurality of finger assemblies is rotatably connected.

8. The robot hand of claim 7, further comprising a rotation driving unit connecting the rotating portion and the support portion, and rotating the rotating portion.

9. The robot hand of claim 4, further comprising a finger driving unit arranged in the body portion to be connected to the finger assembly for rotating the finger assembly.

10. The robot hand claim 4, wherein a first one of the main frame or the tip portion comprises an insertion portion, and a second one of the main frame or the tip portion comprises a path guide portion into which the insertion portion is movably inserted for guiding a movement of the insertion portion.

* * * * *